United States Patent [19]

Morita

[11] Patent Number: 4,593,736

[45] Date of Patent: Jun. 10, 1986

[54] CASE OR BAG COVERED WITH A MAGNET SHIELDING MATERIAL

[76] Inventor: Tamao Morita, Tokyo, Japan

[21] Appl. No.: 689,975

[22] Filed: Jan. 9, 1985

[51] Int. Cl.[4] .............................................. B65B 11/00
[52] U.S. Cl. .................................... 150/147; 150/131; 174/35 R
[58] Field of Search ............. 150/147, 131; 174/35 R; 206/454; 378/188

[56] References Cited

U.S. PATENT DOCUMENTS

| | | | |
|---|---|---|---|
| 3,324,918 | 6/1967 | Miller | 150/147 |
| 3,325,825 | 6/1967 | Christianson et al. | 174/35 R |
| 4,381,421 | 4/1983 | Coats et al. | 174/35 R |
| 4,386,388 | 5/1983 | Beun | 174/35 R |
| 4,438,164 | 3/1984 | Pfeifer | 206/454 |
| 4,468,702 | 8/1984 | Jandrell | 174/35 R |
| 4,514,586 | 4/1985 | Waggoner | 174/35 R |

*Primary Examiner*—Joseph Man-Fu Moy
*Attorney, Agent, or Firm*—Holman & Stern

[57] ABSTRACT

A case or bag for protecting and housing cards in which magnetically stored records are read out by a device to make various identifications, such as bank cards for automatic withdrawals, credit cards for purchasing goods and services on credit, membership cards for identifying membership of various clubs, and cards for identifying the seal of an individual registered with a government office, the case or bag having a portion made of a magnetic shielding plate or mesh which acts to prevent magnetic force from entering from outside the case and affecting the stored record in the cards.

12 Claims, 6 Drawing Figures

U.S. Patent  Jun. 10, 1986  4,593,736
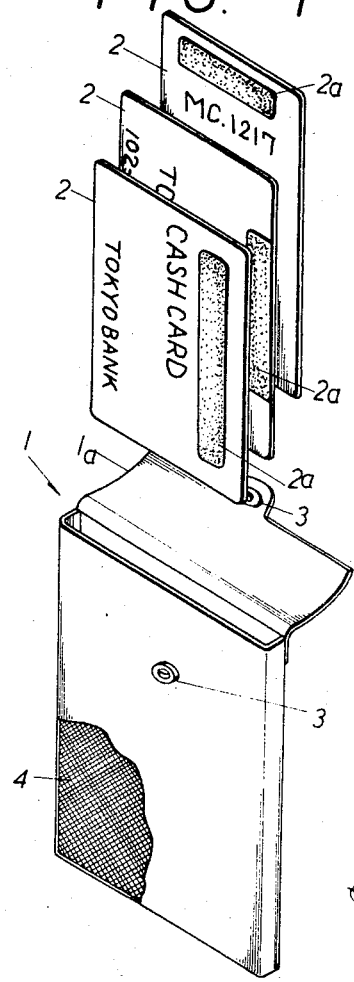
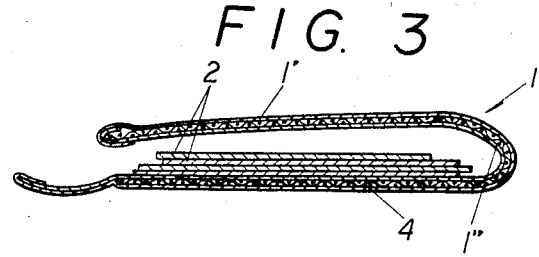
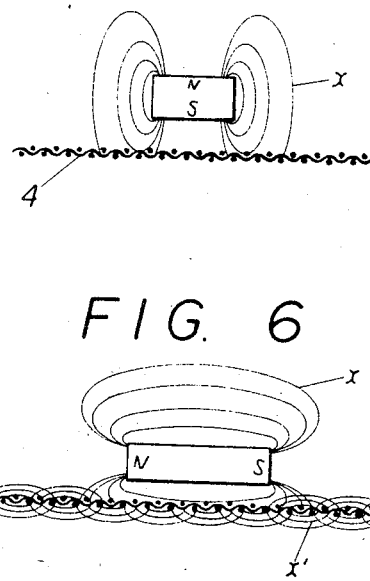
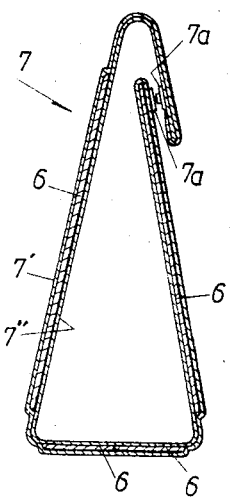
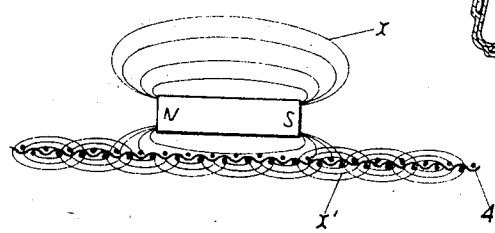
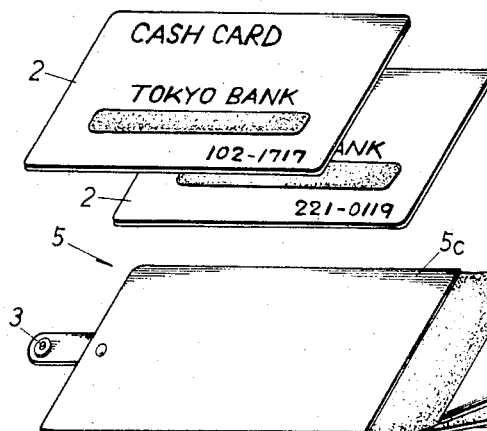
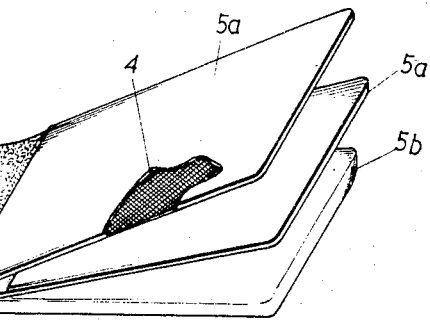

CASE OR BAG COVERED WITH A MAGNET SHIELDING MATERIAL

BACKGROUND OF THE INVENTION

1. Field of the Invention

The present invention relates to a case having a protective function for a card with magnetically recorded data therein or thereon, particularly a function of shielding the card from the effects of external magnetic force which might destroy or distort the recorded data. It also relates to a bag which has such a case member as a part thereof.

2. Description of the Prior Art

Cards of various types such as bank cards, credit cards, membership cards and ID cards are being widely used today. These cards often have portions that store confidential records for identification of the owner in order to prevent unauthorized use by those other than the legitimate owner. The confidential information for identification are usually numbers, signatures, fingerprints or voice of the owners.

Although various means are employed for identification, the magnetically recorded cards are most often employed because they easily make an identification, entail comparatively less errors, and are easy to prepare.

A magnetic card of this type has a portion for magnetically storing data, which data is to be read out by a read-out apparatus and compared with a statement made by the owner (orally or by manipulation of the apparatus) to determine if the two are identical or not.

Such cards are advantageous in that the confidential data thus stored are not visible from outside, and the cards are usable even when wet or soiled to make an identification. On the other hand, they are inconvenient because they are liable to be destroyed by magnetic force, usually by that of 350 Gs or more. When the stored data becomes thus destroyed by magnetic force, it is not possible to ascertain this from the outside appearance of the card; one learns that it is no longer usable only when one tries to use the card, resulting in great inconveniences.

In the present day environment, there are various places and articles which generate magnetic force; for example, electric appliances, industrial machines, medical appliances, etc. generate electromagnetic fields. There are also many permanent magnets used in common conveniences and devices.

Permanent magnets, in particular, are used quite often as a means to catch the flap of hand bags, or as a means to keep the door of a cabinet closed. They are quite capable of destroying the magnetic record on cards as above mentioned.

BRIEF SUMMARY OF THE INVENTION

The object of the present invention is to overcome the problems above described and does this by providing a magentic shield on the case or bag for encasing the card, to thereby prevent destruction of magnetic data stored in the card.

BRIEF DESCRIPTION OF THE DRAWINGS

The invention will now be described in detail with reference to the accompanying drawings wherein:

FIG. 1 is a perspective view of a case and cards embodying the present invention, with a portion of the cover of the case omitted to show inner parts;

FIG. 2 is a perspective view showing another embodiment of the present invention also with a portion of the case emitted.

FIG. 3 is a cross-sectional view showing a typical case and cards encased therein;

FIG. 4 is a cross-sectional view of another embodiment of the invention in the form of a bag;

FIG. 5 is a schematic view to explain the effect achieved by shielding completely with a mesh; and FIG. 6 is another schematic view to explain how magnetic leakage occurs as the mesh fails to fully shield the magnetic force.

DETAILED DESCRIPTION

A typical embodiment of the present invention is now explained. FIG. 1 shows a case 1 used exclusively for cards 2. The card 2 shown here has a portion 2a for magnetically storing a record, and stores numbers, symbols, etc. The card 2 is read out and identified by a magentic read-out device (not shown).

The case 1 is similar to other types of cases used for encasing cards, and may be made of leather, fabric or synthetic resin.

The case 1 may have a flap 1a. The case with a flap 1a may or may not have connectable snaps 3, 3. On the peripheral surface of such a case 1, or the portion encasing the card 2, is provided a strongly magnetic mesh 4. A typical example of the mesh 4 is structured so that the mesh 4 is held between the surface 1' and the lining 1" of the case 1.

The mesh 4, however, is not necessarily required to be held between the surface 1' and the lining 1", but it may be placed on the front side, or outside, of the lining 1" to comprise a case 1.

The embodiment shown in FIG. 2 uses a portion or whole of a folder 5 for cards 2 such as a wallet, card case or season ticket holder. Encasing portions respectively are covered with the mesh 4.

The folder 5 has a plurality of portions 5a—5a for encasing cards 2, a portion 5b for cash, and a portion 5c for a season ticket. Closing snaps 3, as mentioned above, may also be provided.

Since the case 1 has a strongly magnetic mesh 4 around the peripheral surface of the cards 2 encased therein, the magnetically recorded data 2a stored in the card 2 is well protected as the magnetic force is captured by the mesh 4 when the case 1 is placed inside a magnetic field.

The cards 2, in particular, are protected against contact with the mesh 4 by the lining material 1" and is completely shielded from the effect of the magnetic field generating within the mesh 4.

The advantages of such magnetic shield achieved by the mesh 4 are that because the mesh 4 is flexible, the surface 1' and the lining 1" may be handled in a similar manner; they may be sewed together. The appearance and touch of the case 1 are similar to ordinary cases. When the mesh 1 is made elastic, the case 1 may be given a unique bulk to facilitate encasing of the cards and to give a better appearance.

The embodiment shown in FIG. 4 is a bag 7 using a strongly magnetic plate in place of the above mentioned mesh 4. This is used when a magnetic seal stronger than that of the mesh 3 is required.

When the magnetic force exceeds a prescribed amount, the magnetic force X which forms a magnetic field inside the mesh 4 leaks outside to form the magnetic field X' as shown in FIG. 6. Thus, a plate having a larger magnetic volume than the mesh 4 is used.

The plate 6 is also different from the mesh 4 in that it gives rigidity to the bag 7 and prevents the bag 7 from bending, and protects the cards 2 placed inside the bag 7 from becoming broken by a mechanical impact from an outside source.

The bag 7 has the surface material 7' and the lining material 7" similarly as in said case 1, and has a structure common to other general hand bags and pocket books.

As is clear from the construction explained above, the case or bag of the present invention is capable of protecting cards 2 placed therein from magnetic force, and also of effectively protecting against external mechanical force. Thus, the case or bag ensures safe and secure encasing and carrying of the cards 2.

What we claim is:

1. A protective card holder for encasing a card having a magnetic record stored thereon or therein comprising:
    a non-magnetic first liner in the shape of an envelope having a pocket therein for moveably receiving the card to completely enclose at least that part of the card containing the stored magnetic record; and
    a second liner of magnetic shielding material completely surrounding said pocket in substantially overlying relationship so that said second liner shields the stored magnetic record from magnetic force external to said liners.

2. A card holder as claimed in claim 1 wherein said magnetic shielding material has a structure and composition which produces a magnetic field by completely capturing said external magnetic force.

3. A card holder as claimed in claim 1 and further comprising a third outer liner of non-magnetic material surrounding said second liner in overlying relationship.

4. A card holder as claimed in claim 2 and further comprising a third outer liner of non-magnetic material surrounding said second liner in overlying relationship.

5. A card holder as claimed in claim 1 wherein said second liner comprises a flexible mesh material.

6. A card holder as claimed in claim 2 wherein said second liner comprises a flexible mesh material.

7. A card holder as claimed in claim 3 wherein said second liner comprises a flexible mesh material.

8. A card holder as claimed in claim 4 wherein said second liner comprises a flexible mesh material.

9. A card holder as claimed in claim 1 wherein said second liner comprises solid plate material.

10. A card holder as claimed in claim 2 wherein said second liner comprises solid plate material.

11. A card holder as claimed in claim 3 wherein said second liner comprises solid plate material.

12. A card holder as claimed in claim 4 wherein said second liner comprises solid plate material.

* * * * *